(No Model.)  2 Sheets—Sheet 1.
J. H. BULLARD.
BRAKE FOR BICYCLES.
No. 582,600. Patented May 11, 1897.
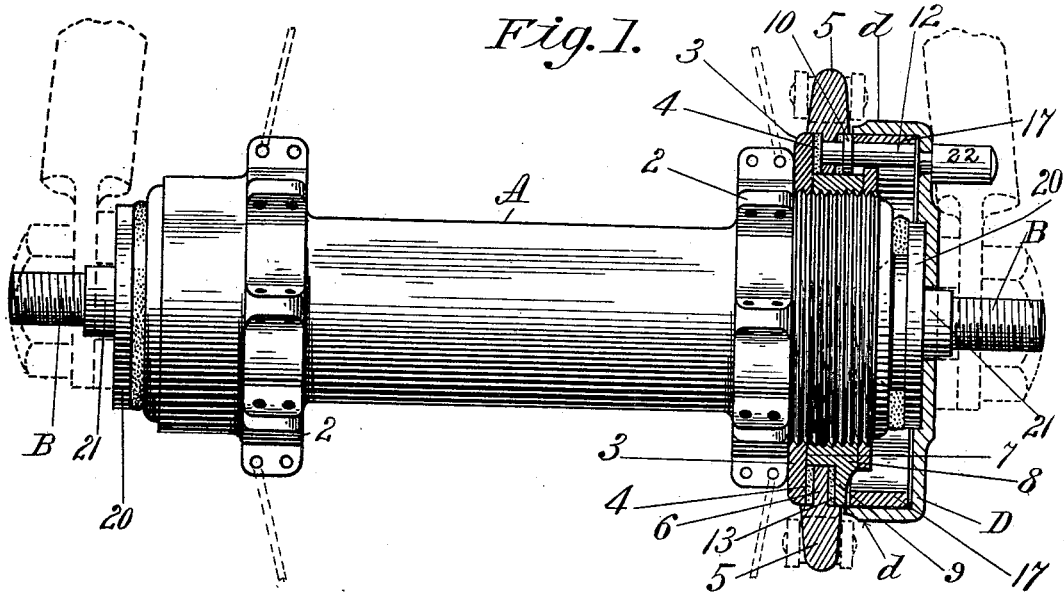
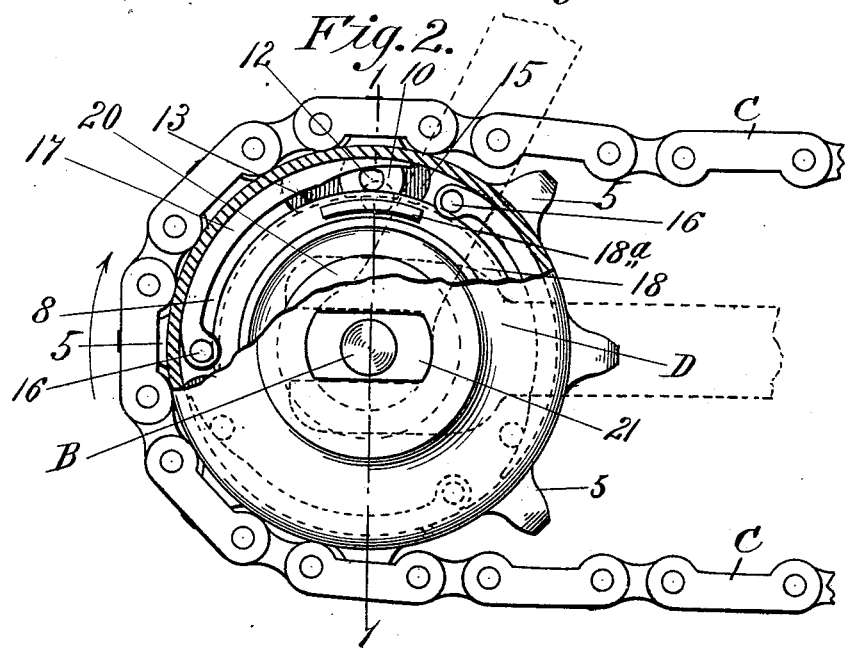
Witnesses:
J. R. Garfield
N. I. Clemons
Inventor,
James H. Bullard,
by Chapin &c.
Attorneys.

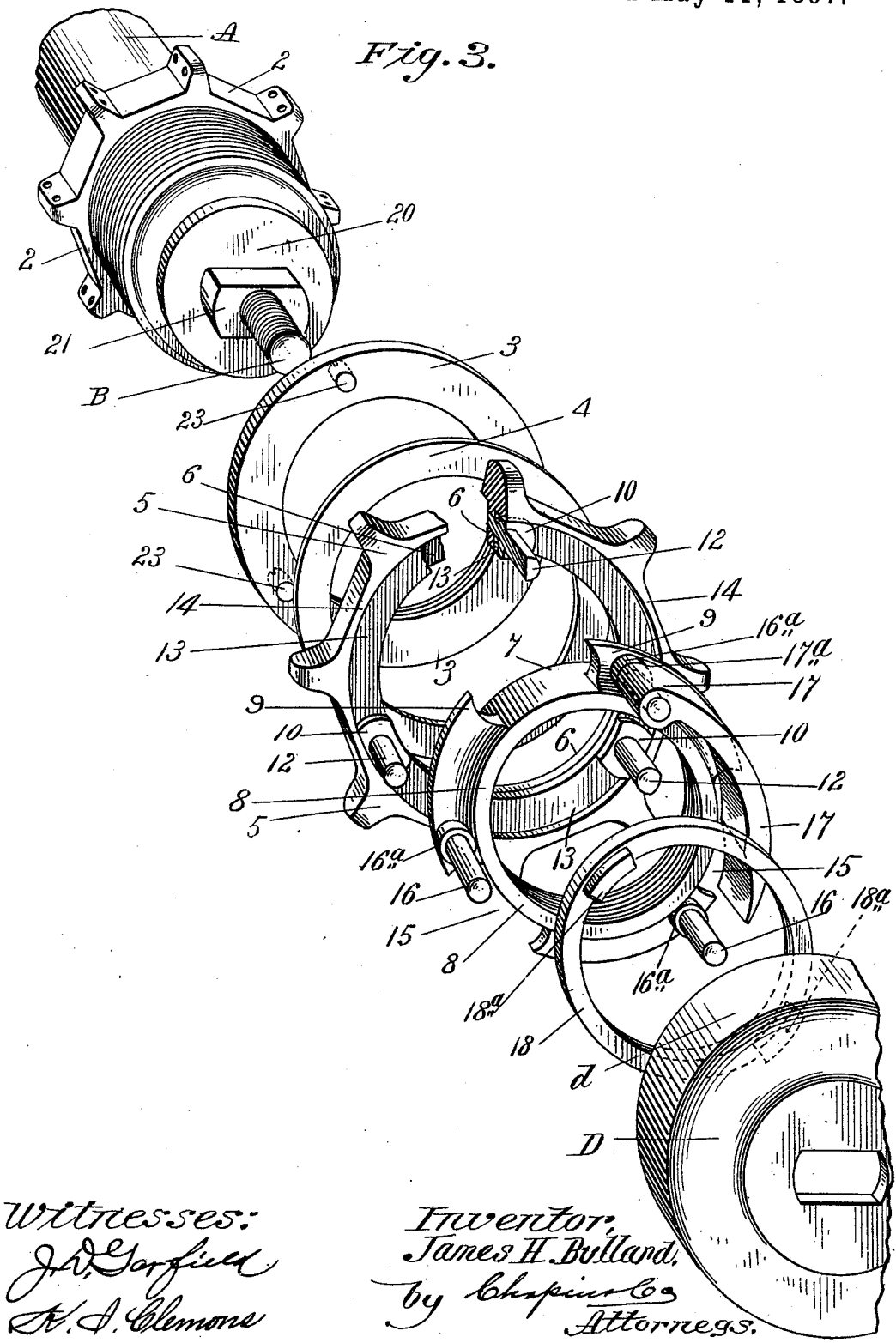

UNITED STATES PATENT OFFICE.

JAMES H. BULLARD, OF SPRINGFIELD, MASSACHUSETTS, ASSIGNOR OF ONE-HALF TO HENRY A. CHAPIN, OF SAME PLACE.

BRAKE FOR BICYCLES.

SPECIFICATION forming part of Letters Patent No. 582,600, dated May 11, 1897.

Application filed February 3, 1897. Serial No. 621,729. (No model.)

*To all whom it may concern:*

Be it known that I, JAMES H. BULLARD, a citizen of the United States of America, residing at Springfield, in the county of Hampden and State of Massachusetts, have invented new and useful Improvements in Brakes for Bicycles and Analogous Vehicles, of which the following is a specification.

This invention relates to brakes for bicycles or similarly-propelled vehicles, and particularly to that class of brakes operated by the limited rotary movement of the sprocket-wheel on its hub, the object of the invention being to provide a brake of little weight, yet capable of exerting great pressure on the surface against which the brake-shoes are applied to arrest the motion of the vehicle to which said brake is attached; and the invention consists in the construction shown and described in the drawings and specification forming part of this application.

In the drawings forming part of this application, Figure 1 is a side elevation of the hub of a bicycle-wheel having the brake thereon which forms the subject of this specification, shown in section on one end thereof and also showing the stationary case within which the shoes of said brake revolve. Fig. 2 is an end view of the hub shown in Fig. 1 on which said brake is applied, showing the stationary case partly broken away and also showing the brake set. Fig. 3 is a perspective view of the end of a wheel-hub to which the brake is attached and shows the elements constituting said brake in separated positions in the order in which said parts are assembled.

Referring to the drawings, A represents the hub of the bicycle-wheel, which rotates on an axle B, rigidly held in the frame of the machine in the usual manner. In applying my improved brake mechanism to said hub the exterior surface of the sprocket end thereof is threaded from the spoke-flange 2 outward, and the ring 3 is then screwed thereon up to a bearing against said flange 2. A thin ring 4, of gun-metal or other good bearing metal, is then passed on over the end of said hub, which ring, when the sprocket-wheel 5 is in its proper place, will lie interposed between one side of the web 6 of said sprocket and the face of said ring 3. Said sprocket-wheel 5 is constructed, as shown in the drawings, Figs. 2 and 3, with a thin web 6, located midway between the two sides thereof, and has no screw engagement with the hub of the wheel, but it fits freely on the hub 7 of the ring 8, which is provided with the flange 9, the face of which, contiguous to the web of the sprocket-wheel, is parallel with said web and at right angles to the hub of the said ring 8. This sprocket has a limited rotary movement on the hub 7 of the ring 8, the degree of which movement is determined by the engagement of the bases 10 of the pins 12, fixed in the web of the sprocket-wheel, and which pins project parallel with the axis of said wheel outwardly toward the end of the hub, the flange 9 of the ring being cut away, as shown in Fig. 3, to allow said pins to project over the faces of said ring 8. In the drawings three pins are shown, equidistant from each other, which are riveted in said web of the sprocket-wheel. Said pins are provided with the bases 10, of larger diameter than said pins, and which bear on the web 6 of the sprocket and make the latter as rigid as possible. Before said pins are riveted into said web 6 the ring 13, similar to the ring 4, is laid on the web 6, and said pins 12 pass through suitably-located holes therein and are then secured by riveting, as described. The bases 10 of said pins 12 bear firmly on said ring 13, permanently securing the latter against the faces of the web 6 on the side thereof opposite to that which bears against the ring 4. Thus constructed the sprocket 5, the ring 13, and the pins 12 constitute practically one piece, which, being placed on the hub of the ring 8, the latter is then screwed onto the threaded end of the wheel-hub, and, the diameters of the rings 3 and 4 being a little less than the extreme diameter of the web part of the sprocket, the said rings fit closely in under the rim 14 of said sprocket, and thus the bearing-surfaces of the parts which serve as clamps between which the said sprocket-web 6 is secured are protected thoroughly from grit and dust, which in time might cause wear if they were not so protected.

When said sprocket, as above described, is placed on the hub of the ring 8, the pins 12, attached to the sprocket-wheel, lie in the cut-away portions 15 of the said flange 9 of the ring 8. The cutting away of these portions 15 leaves the said flange 9 in three sections, each end of each section being curved to conform to the periphery of the bases 10 of the pins 12, which bases bear against one end of said sections of the flange 9 when the wheel is driven forward and move toward the ends of the next section when the sprocket-wheel is given a rotary movement on its hub to set the brake, which movement is effected through the chain C by back pressure on the pedals. Near one end of these sections of the flange 9 are located the pins 16. These pins are, like the pins 12, provided with broad bases 16$^a$, whereby they are made more rigid and are by one end riveted into suitable holes in the said flange. These pins 16 have their axes parallel with the axes of the pins 12. Fitted freely on these pins 16 by one end are three arc-shaped brake-shoes 17. Said shoes are made of steel, suitably tempered, and are identical in all respects. The curve of the outer surface of these brake-shoes conforms absolutely with the curve of the interior of the rim $d$ of the stationary case D, which is concentric with the wheel-hub on which the ring 8 is screwed.

The length of the brake-shoes 17 is somewhat greater than the distance between one of the pins 16 and that one of the pins 12 next ahead of it, using the word "ahead" as indicating the line of movement of the sprocket-wheel as the machine is being driven forward.

The forward ends of the brake-shoes overlapping the pins 12 (see Fig. 2) are tapered from their point backward on the under side, and said tapered or wedge-shaped ends rest on the upper or outer side of the said pins.

When the ring 8 has been screwed up far enough to clamp the web of the sprocket-wheel with such force as to apply thereto the required resistance to its rotary movement, the jam-nut 18 is screwed onto the wheel-hub and locks the ring 8. This jam-nut is made circular in form and is provided with two lugs 18$^a$, projecting from the side thereof, over which a spanner of suitable form is fitted to operate said nut. The circular form of the nut also permits it to be made of such diameter as will bring its outer periphery in contact with the inner edges of the pins 12, as shown clearly in Figs. 1 and 2, and whereby a further support for said pins is provided other than their point of attachment to the sprocket-wheel. It will be observed that said point of support comes under the inner edge of the brake-shoes and thus insures a practically unyielding point of support, which enables the pins 12 to take the great pressure from the brake-shoes when the brake is operated. Said nut also acts as a support for the pins 16, on which the brake-shoes are pivotally supported, as said nut bears also on the inside of said pins, though a little nearer their point of attachment to the sections of the flange 9 on the ring 8 than it does to the point of attachment of the pins 12 to the web of the sprocket.

The brake-shoes 17 are placed on their pins 16 after the nut has been screwed up in place against the ring 8, a portion of the hub end of said shoes being cut away to allow the edge of said shoe to fit closely against the side of the flange 9. This cut in the said end of the brake-shoe is shown in that one of the shoes on the pin 16 in Fig. 3, and is indicated by 17$^a$. A similar cut is made on the inner surface of said hub end of the brake-shoes to allow for the thickness of the jam-nut, so that the said shoes may be placed in position, as stated, after the nut has been screwed up to the ring 8. Fig. 2 shows the periphery of the said nut in contact with the inner edge of the pins 16 for the support thereof, as described, and shows the extent to which said nut is overlapped by the hub ends of said brake-shoes 17.

In a hub construction such as is shown herein, with the ball-cups in the barrel of the hub and the ball-cones 20 adjustable on the axle B, the said ball-cones are provided with a hub 21, having two parallel sides, which fits into the forked end of the frame of the machine and is thereby prevented from turning after it has once been adjusted.

The stationary case D is made of steel or other suitable metal and has an annular rim $d$, the width of which is a little greater than the width of the brake-shoes 17, which lie within it, and said case is provided with an opening centrally therein, through which the said hub 21 of the ball-cone passes, and as said hub projects far enough through said case to engage the frame, as described, it is rigidly held by said engagement with the hub 21 against rotation. In addition to this means of holding said case against rotation, when the rotating brake-shoes are cammed out against the inside of the rim $d$ of the said case a pin 22 is riveted thereto, projecting therefrom parallel with the axis of the axle B, of sufficient length to engage the frame of the machine, and may be so placed as to engage the vertical or the horizontal brace thereof. In the drawings it is shown in contact with the vertical brace (see Fig. 1) and dotted in its position in Fig. 2.

From the above description it will be seen that the principal elements of the herein-described brake mechanism consist, first, in a sprocket-wheel having a limited movement on its hub under a certain determined resistance and pins on said sprocket-wheel; second, a flange fixed on the wheel-hub, having pins thereon on which are pivotally supported several brake-shoes by one end, and the opposite of which shoes are provided with tapered ends which rest on the pins on said sprocket, said flange being fixed on said hub and said sprocket rotatable thereon, and, third, a fixed case inclosing said brake-shoes and concentric with said flange.

When the machine is being driven forward and the chain is moving in the direction of the arrow in Fig. 2, the pins 12 on the sprocket-wheel will be moved to a position under the thin point of the tapered end of the brake-shoes, and said shoes will be free to turn by the rotation of the wheel in the case D. The bases of the pins 12 will abut against the ends of the sections of the flange 9, and a positive engagement of the sprocket and its hub will be thereby effected to drive the wheel forward. As soon, however, as any back pressure is put upon the pedal by the rider the sprocket-wheel is rotated on its hub to a certain degree in a direction against the arrow on said Fig. 2 and the pins 12 are simultaneously brought into contact with the tapered ends of said brake-shoes 17, forcing them outwardly against the inner side of the rim $d$ of the case D, and the frictional contact of said parts operates to retard the revolution of the wheel, and by reason of the resistance to the rotational movement of the sprocket it is obvious that the latter will remain in any position relative to its hub in which it may be placed until an amount of force to move it back again to the point from which it was first started is applied thereto through the chain by forward pedaling. Should there be sufficient wear between the surfaces of the web 6 of the sprocket-wheel and the rings 4 and 13, and thereby the rotary movement of the sprocket becomes too free, means for taking up said wear and maintaining said resistance, as desired, are provided by placing the screws 23 in the ring 3. (Shown only in Fig. 3.) These screws pass through said ring, and their inner ends abut against said ring 4, and in case of wear, as above set forth, these screws may be turned up to a bearing against said ring to put as much pressure against the web of the sprocket as may be desired.

The wear of the contacting surfaces of the brake-shoes or the rim of the case D takes care of itself, as the pins 12 move farther back to engage the tapered ends of the brake-shoes as said wearing away of the surfaces takes place. When so much of the brake-shoes has been worn away that it becomes necessary to replace them, it is only necessary to remove the rear wheel from the frame, remove the old shoes and replace them with new ones, and place the wheel in the frame again.

The entire brake mechanism and case is removable with the rear wheel.

The brake made as herein described is light and exceedingly powerful, but as the power is applied in planes at right angles to the axis of the hub no strain is brought on the bearings of the latter when the brake is operated. The parts subjected to wear are easily replaced and of trifling cost.

Having thus described my invention, what I claim, and desire to secure by Letters Patent, is—

1. A brake mechanism for bicycles and similar vehicles consisting of a wheel-hub, a sprocket-wheel having a limited rotatable movement thereon, a flange fixed on said hub, brake-shoes pivoted by one end on said flange, means on said sprocket-wheel for engagement with the free ends of said brake-shoes whereby they are moved in a plane at right angles to the axis of said hub, a stationary case inclosing said brake-shoes, and means for moving said sprocket-wheel, substantially as described.

2. A brake mechanism for bicycles and similar vehicles consisting of a wheel-hub, a sprocket-wheel having a limited rotatable movement thereon, under a controlled resistance, a flange fixed on said hub, brake-shoes on said flange, means on said sprocket-wheel for engagement with the free ends of said brake-shoes whereby they are moved in a plane at right angles to the axis of said hub, a stationary case inclosing said brake-shoes, and means for moving said sprocket-wheel, substantially as described.

3. A brake mechanism for bicycles and similar vehicles consisting of a wheel-hub, a sprocket-wheel having a limited rotatable movement thereon under a controlled resistance, a flange fixed on said hub, brake-shoes supported on said flange, the free ends of which brake-shoes are tapered or wedge-shaped, means on said sprocket-wheel for engagement with the free ends of said brake-shoes whereby they are moved in a plane at right angles to the axis of said hub, a stationary case inclosing said brake-shoes, and means for moving said sprocket-wheel, substantially as described.

4. A brake mechanism for bicycles or similar vehicles consisting of a wheel-hub, a sprocket-wheel positively engaging said hub and having a limited rotary movement thereon under a controlled resistance, pins fixed in said sprocket, a flange fixed on said hub having portions thereof cut away for the reception of the pins in said sprocket, pins on said flange, brake-shoes supported thereon, and whose opposite wedge-shaped ends bear on said sprocket-pins, a stationary case inclosing said brake-shoes and means for rotatably moving said sprocket-wheel on said wheel-hub, substantially as described.

5. A brake mechanism for bicycles or similar vehicles consisting of a wheel-hub, a sprocket-wheel having a limited rotary movement thereon under a controlled resistance, pins fixed by one end in said sprocket, a flange fixed on said hub having pins therein, brake-shoes pivoted on said pins by one end, and whose free wedge-shaped ends rest on said sprocket-wheel pins, means of support for the latter under said brake-shoes, and a stationary case inclosing the brake-shoes, and means for rotatably moving said sprocket-wheel on its hub, substantially as described.

6. A brake mechanism for bicycles consisting of a sprocket-wheel, a support therefor, brake-shoes pivotally secured by one end on said support and rotating therewith, said sprocket-wheel being movable under a controlled resistance relative to said brake-shoes, means on said sprocket-wheel for engaging said brake-shoes for swinging them in a plane at right angles to the axis of said support, a stationary case inclosing said brake-shoes, and means for rotatably moving said sprocket-wheel on its support, substantially as described.

JAMES H. BULLARD.

Witnesses:
H. A. CHAPIN,
K. I. CLEMONS.